Aug. 4, 1959     R. S. HINSEY     2,897,686
MECHANISM CONTROL

Filed Jan. 20, 1954     2 Sheets-Sheet 1

INVENTOR
ROBERT S. HINSEY
BY
Harry O. Ernsberger
ATTORNEY

Aug. 4, 1959
R. S. HINSEY
2,897,686
MECHANISM CONTROL
Filed Jan. 20, 1954
2 Sheets-Sheet 2
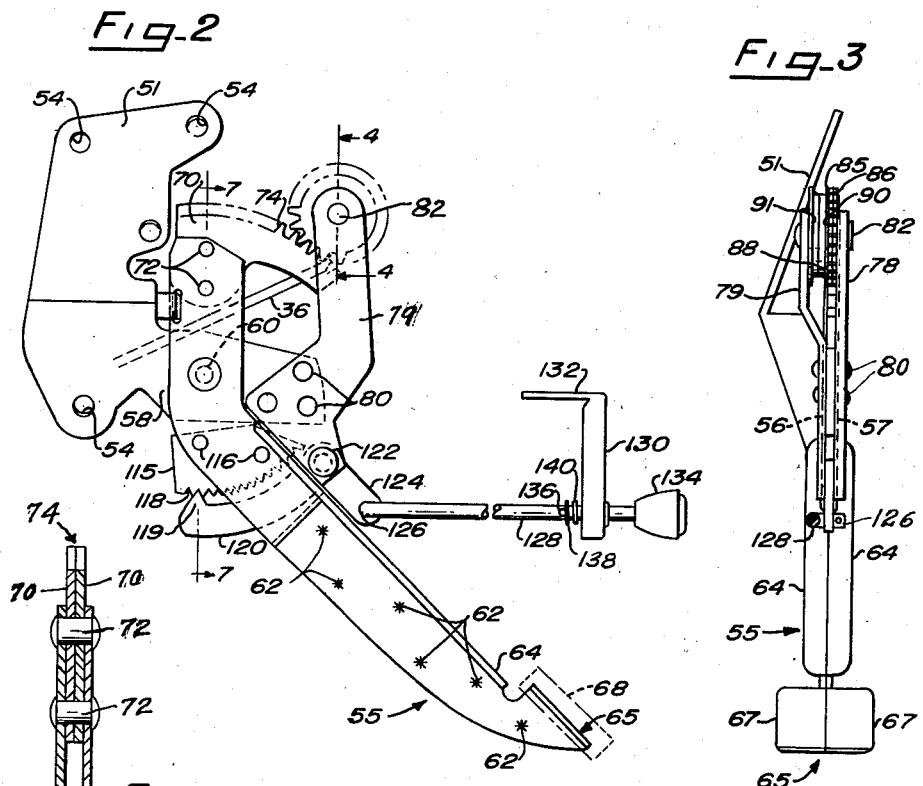
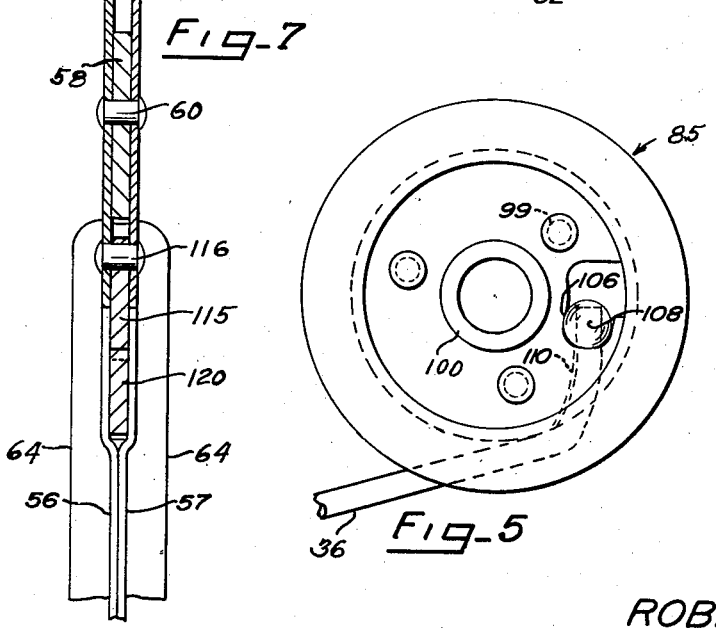
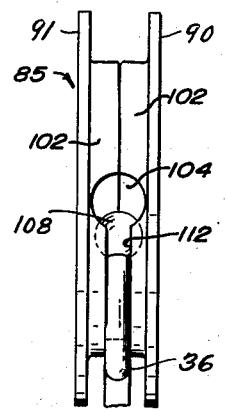
INVENTOR
ROBERT S. HINSEY
BY
Harry O. Ernsberger
ATTORNEY United States Patent Office 2,897,686
Patented Aug. 4, 1959

2,897,686

MECHANISM CONTROL

Robert S. Hinsey, Toledo, Ohio, assignor, by mesne assignments, to The Bingham-Herbrand Corporation, a corporation of Ohio Application January 20, 1954, Serial No. 405,183

4 Claims. (Cl. 74—540)

This invention relates to mechanism control devices and more especially to means or apparatus for actuating and controlling brake mechanism of a vehicle.

The invention comprehends the provision of a lever arrangement in combination with a sheave and cable means connecting the lever arrangement with the brakes of a vehicle whereby force-multiplying means of desired ratio may be attained.

An object of the invention resides in the provision of a lever and operating means for a flexible cable connected with vehicle brakes wherein pressure applied to the lever is transmitted to the cable at a desired ratio of force multiplication.

Another object of the invention is the provision of a foot-actuated lever or pedal mechanism in conjunction with a sheave and cable construction wherein the sheave is rotated by the lever to transmit motion through the cable for operating mechanism to be controlled thereby.

Another object of the invention resides in a foot-operated lever construction for controlling brake mechanism of a vehicle, the arrangement incorporating gearing for actuating a power-transmitting medium connecting the lever construction with the brake mechanism.

Another object of the invention resides in the provision of a foot-operated lever construction for actuating vehicle brakes in combination with a cable and sheave arrangement actuated by movement of the lever wherein sheaves of different diameters may be employed to change the ratio of force applied to the brake-actuating cable, thus rendering the arrangement readily adaptable for various installations of mechanism control requiring different force multiplication without modifying the lever construction.

Another object of the invention resides in a foot-operated lever or pedal for actuating vehicle brake mechanism wherein a sheave journaled upon a stationary support is connected by cable means to the brake mechanism so as to provide for a substantially straight-line movement of the cable and wherein a curved rack-and-pinion means transmits the movement of the foot-operated lever to the sheave for controlling the cable without variation of the force multiplication factor.

Further objects and advantages are within the scope of this invention such as relate to the arrangement, operation and function of the related elements of the structure, to various details of construction and to combinations of parts, elements per se, and to economies of manufacturer and numerous other features as will be apparent from a consideration of the specification and drawing of a form of the invention, which may be preferred, in which:

Figure 2 is a detail side elevational view of the mechanism control device illustrated in Figure 1;

Figure 3 is a front elevational view of the construction shown in Figure 2;

Figure 5 is a side elevational view of a sheave construction forming a part of the mechanism;

Figure 6 is a front elevational view of the construction shown in Figure 5, and

Figure 7 is a vertical sectional view taken substantially on the line 7—7 of Figure 2.

While a form of the mechanism control of the invention is illustrated as installed in a vehicle and utilized for actuating or controlling the emergency or parking brakes of the vehicle, it is to be understood that the invention may be used with any apparatus or mechanism where it may be found to have utility.

Figure 1:
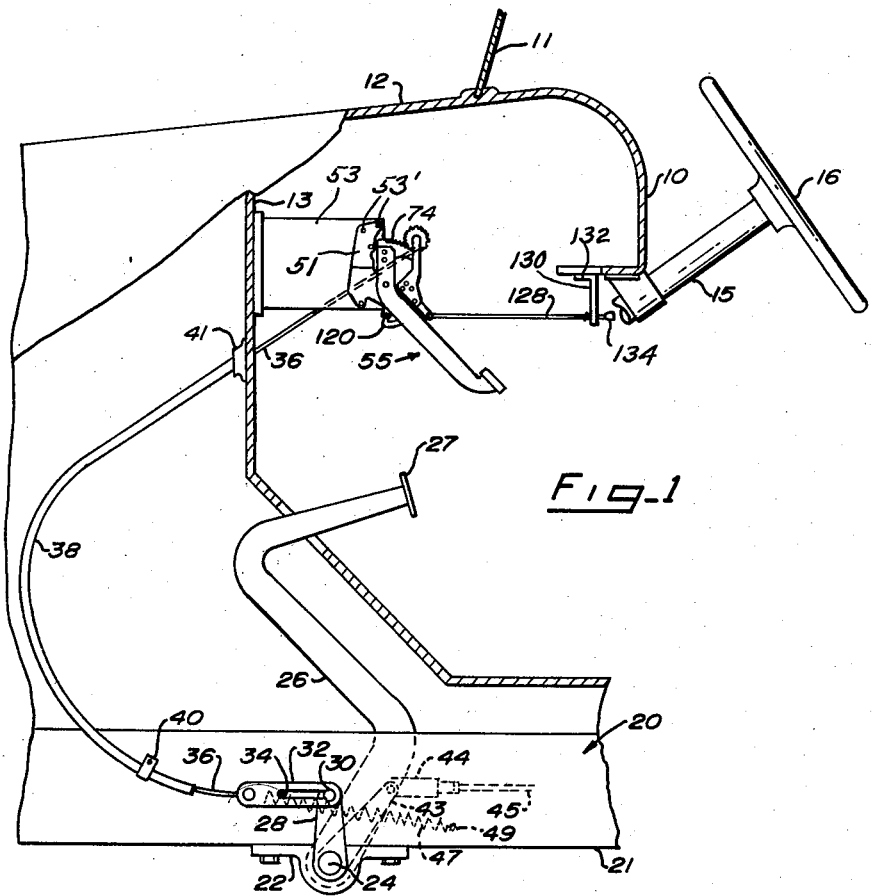
Figure 1 is an elevational view, partly in section, showing an operator's compartment of a vehicle, illustrating an embodiment of the present invention installed in a vehicle for actuating the brakes.

Referring to the drawings in detail, there is illustrated in Figure 1, a portion of a vehicle adjacent the operator's compartment, the portion of the vehicle shown including an instrument panel 10, a windshield 11, a cowl portion 12, a dashboard or fire wall 13 and a steering column or post 15 upon the upper extremity of which is mounted a steering wheel 16. The vehicle construction has a frame 20 including side frame members 21 (one of which is shown in Figure 1), and each of the members 21 has a bracket 22 secured thereto journally supporting a shaft 24 extending transversely of the frame 20.

Fixedly secured on the shaft 24 is a lever or pedal 26 for actuating the vehicle brakes, the pedal being provided with a foot pad 27. Secured to the shaft 24 is an arm 28 provided at its end zone with a transversely extending pin 30. A clevis or member 32 is arranged astraddle the end of the arm 28, the pin 30 extending through slots 34 formed in the furcations of the clevis.

The clevis 32 is connected to one end of a cable 36 encased in a sheath or guide means 38. One end zone of the sheath is fixedly secured to frame member 21 by means of a clip 40 and the other end of the sheath is secured to a grommet or member 41 fixedly connected to the fire wall or dashboard 13 of the vehicle. The cable 36 is connected to the mechanism control device of the invention in a manner hereinafter described. Secured upon the shaft 24 is a second arm 43 which is connected by means of a clevis 44 and a rod 45 to the brake mechanism (not shown) of the vehicle. A contractile spring 47 is connected at one end with the clevis 32 and its other end is anchored as at 49 to the vehicle frame. The spring normally urges or biases the clevis member 32 and cable 36 toward brake-released position.

As illustrated in the several figures of the drawings, the mechanism control or brake-actuating means of the invention is mounted upon a support or bracket 51 carried by a second bracket or strut 53 secured to the fire wall 13 or other portion of the vehicle. The bracket 51 is secured to its support by means of rivets or bolts 53' extending through openings 54 shown in Figure 2.

The mechanism control of the invention is inclusive of a lever construction 55 of the foot-operated or pedal type. The lever is formed of similarly shaped sections 56 and 57 formed of sheet metal. The upper zones of the sections 56 and 57 are spaced apart as shown in Figures 3 and 7 and are disposed astraddle a substantially vertical, uniplanar portion 58 of the supporting bracket 51. The sections 56 and 57 of the lever or pedal and the portion 58 of the bracket are provided with aligned openings receiving a rivet or pin 60 which forms a fulcrum for the lever or pedal. Portions of the sections of the lever members below the fulcrum pin 60 are in engaging relation as shown in Figures 3 and 7 and are welded together at several points or zones indicated at 62 in Figure 2. The strength or rigidity of the lever or pedal construction 55 is increased through the formation of a transversely extending flange 64 formed on each of the sections 56 and 57. A foot pad portion 65 is formed of two transversely extending, aligned flanges or pads 67 which are adapted to be embraced by a rubber foot pad 68 shown in broken lines in Figure 2.

The upper end of the pedal construction is provided with a pair of juxtaposed plates or members 70 disposed between the upper ends of sections 56 and 57 and securely fastened together and to the lever sections by means of rivets 72. The upper regions of the members 70 are formed with gear teeth 74, providing a curved rack or gear sector, the pitch line of the teeth being generated as a radius about the axis of the pivot shaft or lever fulcrum 60. The teeth may be formed by a punching operation and thus reduce the cost of manufacture.

Secured to the planar portion 58 of bracket 51 at opposite sides thereof are upwardly extending members 78 and 79 which are fixedly secured to the planar portion 58 by means of rivets 80. The upper extremities of the projections 78 and 79 are provided with aligned openings to receive a shaft or pin 82. Journally supported for rotation upon the pin 82 is a sheave construction 85 and a gear or gear construction 86. The teeth 88 of the gear 86 are adapted for enmeshment with the teeth 74 of the gear sector formed by members 70 whereby pivotal movement of the pedal about the axis of the shaft or fulcrum 60 causes rotation of the gear 86 and the sheave 85. The sheave 85 is formed of two similar sections or components 90 and 91 of sheet metal which are joined together to form a peripheral groove or circular recess adapted to receive the brake-actuating cable 36 which is of a dimension to be received in the groove formed in the sheave.

Figure 4:
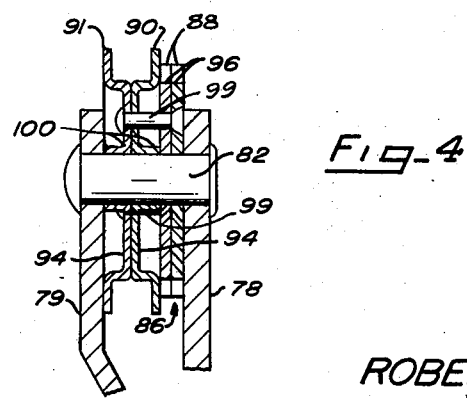
Figure 4 is an enlarged detail sectional view taken substantially on the line 4—4 of Figure 2.

The construction of the sheave 85 and gear 86 is shown in detail in Figure 4. The components 90 and 91 of the sheave construction are formed with web portions 94 arranged in abutting relation. The gear is formed of two identically shaped, flat disks 96 having teeth 97 formed in the peripheries thereof. By making the gear 86 of two components or disks 96, the teeth may be formed by a punching operation at the periphery of the gear disks, thus minimizing the cost of forming the gear construction.

The components 90 and 91 of the sheave construction and the disks 96 forming the gear 86 are joined together to form a unitary construction by means of rivets 99 passing through aligned openings in the gear disks 96 and the web portions 94 of the sheave components as illustrated in Figure 4. Central portions of the sheave components 90 and 91 are formed outwardly to provide hub portions 100 forming bearings to accommodate the pin 82 whereby the sheave and gear are journally supported upon the pin.

The arrangement for securing the cable connecting the actuator with the brake mechanism of the vehicle is shown in Figures 5 and 6. The cylindrical surfaces 102 of sheave 85 which engage the actuating cable 36 are punched out to form a circular opening 104, and the web portions 94 of the sheave components are formed to provide a recess 106 shown in Figure 5. Staked or swaged to the end of the flexible cable 36 is a ball-shaped member 108 forming an anchor for the cable.

In assembly, the ball 108 is received through the opening 104 and nests or engages in the recess 106 formed in the web portions 94 of the sheave components. The webs 94 are relieved or cut along the line 110 to provide an elongated slot 112 shown in Figure 6 accommodating the zone of the cable adjacent the anchor or ball 108 in the manner shown in Figure 5. As the pedal lever 55 is depressed by pressure upon the pad 68, the lever is swung in a clockwise direction as viewed in Figure 2 around the axis of the shaft 60, and the teeth 74 of the gear sector 70 carried by the pedal or lever cause counterclockwise rotation of the gear 86 and sheave 85. This rotation causes the cable 36 to wrap around the sheave 85 and effect a setting of the vehicle brake mechanism.

The construction includes means for holding the brakes in set position by locking or retaining the pedal or lever against reverse rotation about its fulcrum. As particularly shown in Figure 2, the sections 56 and 57 of the pedal lever 55 straddle a member or block 115 secured to the lever sections or components by means of rivets 116. The contour of the lower surface of the block 115 is of a radius generated about the axis of the fulcrum or pivot pin 60, and the surface so generated is serrated, providing a series of recesses 118 adapted to receive a tooth or detent 119 of a pawl 120.

The pawl 120 is mounted for pivotal movement on a headed stub shaft or pin 122 carried by the supporting plate or bracket 51, providing a pivotal mounting for the member. The member 120 is of L-shaped or bell crank configuration having a leg portion 124 provided with an opening adapted to receive an extremity 126 of an operating or pull rod 128 for effecting release of the pawl tooth 119 from a recess 118 engaged by the pawl tooth.

The pull rod 128 extends through an opening in a bracket 130 which has an extension 132 adapted to be secured to the instrument panel or other suitable portion of the vehicle. The end of the rod 128 is equipped with a manipulating knob or handle 134. The rod 128 is provided with a transversely extending pin 136, forming an abutment for a disk or washer 138. Disposed between the disk 138 and the bracket 130 is an expansive coil spring 140 which urges rod 128 in a lefthand direction as viewed in Figure 2 to resiliently and continuously bias the pawl 120 in a direction to engage the pawl tooth 119 with the recesses 118 formed in the block 115.

When it is desired to set the brakes for emergency or parking purposes, foot pressure is applied to the pad 68 to swing the pedal lever in a clockwise direction as viewed in Figures 1 and 2 to brake-setting position, and the sector 70 rotates the gear 86 to cause the cable 36 to be wound upon the sheave 85. The biasing spring 140 urges the pawl tooth 119 into the adjacent recess 118 in the block 115 and thus effectively holds the brakes in set position by preventing return movement of the pedal lever. When the brake mechanism is to be released, a pull is exerted on the knob 134 to compress spring 140 and, through the rod 128, swing the pawl 120 in a counter-clockwise direction as viewed in Figure 2 about its pivotal support 122 to withdraw the pawl tooth 119 from engagement with the serrated portion of the block 115. The pedal lever is thus released; and under the influence of the retracting spring 47 shown in Figure 1, the stress on the cable unwinds the same from the sheave or sheave wheel 85, and through the meshing of gear 86 with the toothed sector 70, the pedal lever is swung to brake-releasing position, viz., the position shown in Figures 1 and 2.

While the illustrated lever construction is especially arranged to be operated by foot pressure to actuate the mechanism to be controlled, it is to be understood that the lever construction may be actuated manually if desired. Various ratios of leverage may be secured through the present arrangement without modifying the construction of the lever member or changing its fulcrum. For example, the diameter of the sheave wheel may be increased or decreased to obtain a change in ratio of the force transmitted to the mechanism to be controlled. The pitch diameter of the gear 86 and the relative position and size of the toothed sector or block 70 may be changed to secure a different ratio of force transmission. Thus, the arrangement may be readily adapted to various installations and the desired ratio of applied power to the force transmitted to the mechanism to be controlled may be attained without modifying the sheet metal lever construction, the support or the locking or retaining means for the lever construction.

It is apparent that, within the scope of the invention, modifications and different arrangements may be made other than is herein disclosed, and the present disclosure is illustrative merely, the invention comprehending all variations thereof.

I claim:

1. Mechanism for controlling brakes of a vehicle including, in combination, a support, a foot-operated lever member pivotally mounted upon the support, said lever member being formed of substantially matched sheet metal sections secured together, one end of said lever member being shaped to provide a foot pad portion, said sheet metal sections being spaced throughout a portion of their length, the spaced portions being disposed astraddle the support, a gear journaled upon the support, a gear sector secured to the sections of the lever member, the teeth of the sector being in mesh with said gear, a sheave secured to said gear, said sheave having a slot formed therein, a cable connected with the brakes of the vehicle and having a portion engageable with the periphery of the sheave, said cable having an anchor member adapted for engagement in the slot formed in the sheave wheel for anchoring the cable to the sheave.

2. Mechanism control including, in combination, a support, a foot-operated lever member pivotally mounted upon the support, a gear journaled upon the support, a gear sector secured to the lever member and in mesh with the teeth of said gear, a sheave wheel associated with said gear, said sheave wheel having a web portion, means extending through openings in said gear and the web portion of said sheave wheel for securing said sheave wheel and gear together, a cable connected with the mechanism to be controlled and having a portion engaging the peripheral region of the sheave wheel, an anchor member secured to the cable, the web portion of said sheave wheel being formed with a recess to accommodate the anchor member on said cable whereby rotation of the sheave wheel established by pivotal movement of the lever member actuates said cable, and means for locking said lever member in brake-setting positions.

3. Mechanism for controlling brakes of a vehicle including, in combination, a support, a foot-operated lever member, said lever member being formed of substantially matched sheet metal sections, said sections having contiguous portions welded together, said sections being spaced throughout a portion of their length with the spaced portions disposed astraddle the support, a pin extending through aligned openings in the sections of the lever member and said support forming a fulcrum for the lever, a gear journaled upon the support, a gear sector secured to the lever sections and in mesh with the teeth of said gear, a sheave wheel associated with said gear, said sheave wheel being formed of matched sheet metal sections having web portions disposed in abutting relation, means securing the web portions together and to said gear, a cable connected with the brakes of the vehicle and having a portion engaging the periphery of the sheave wheel, an anchor member secured to the cable, the web portions of said sheave wheel sections being formed with recesses to accommodate the anchor member on said cable whereby rotation of the sheave wheel established by pivotal movement of the lever member actuates the brakes through said cable, and means for locking said lever member in brake-setting positions.

4. Mechanism for controlling brakes of a vehicle including, in combination, a support, a foot-operated lever member, said lever member being formed of substantially matched sheet metal sections, said sections having contiguous portions welded together, said sections being shaped to provide a foot pad portion at one end of the lever member, said sections being spaced at their upper portions, said spaced portions being disposed astraddle the support, a pin extending through aligned openings in said lever sections and said support forming a fulcrum for the lever member, a gear journaled upon the support, a gear sector secured to the lever sections and in mesh with the teeth of said gear, a sheave wheel associated with said gear, said sheave wheel being formed of matched sheet metal sections having web portions disposed in abutting relation, means extending through openings in said gear and the sections of said sheave wheel for holding said sheave wheel and gear together, a cable connected with the brakes of the vehicle and having a portion engaging the periphery of the sheave wheel, an anchor member secured to the cable, the web portions of said sheave wheel sections being shaped with recesses to accommodate the anchor member on said cable whereby rotation of the sheave wheel established by pivotal movement of the lever member actuates the brakes through said cable, and manually controlled means for locking said lever member in brake-setting positions.

References Cited in the file of this patent

UNITED STATES PATENTS

| | | |
|---|---|---|
| 549,094 | Amrock | Nov. 5, 1895 |
| 1,543,617 | Piper | June 23, 1925 |
| 1,580,201 | Hutchinson | Apr. 13, 1926 |
| 1,948,652 | Edmunds | Feb. 27, 1934 |
| 2,117,109 | Stevenson et al. | May 10, 1938 |
| 2,155,062 | Sandberg | Apr. 18, 1939 |
| 2,303,586 | Snell | Dec. 1, 1942 |
| 2,309,454 | Heller | Jan. 26, 1943 |
| 2,309,734 | Klotsch | Feb. 2, 1943 |
| 2,507,997 | Roedding et al. | May 16, 1950 |
| 2,694,945 | Jandus | Nov. 23, 1954 |

FOREIGN PATENTS

| | | |
|---|---|---|
| 15,918 | Great Britain | June 4, 1903 |